Sept. 29, 1936.     A. S. HAISLIP     2,055,841
ARTIFICIAL BAIT
Filed Sept. 10, 1935
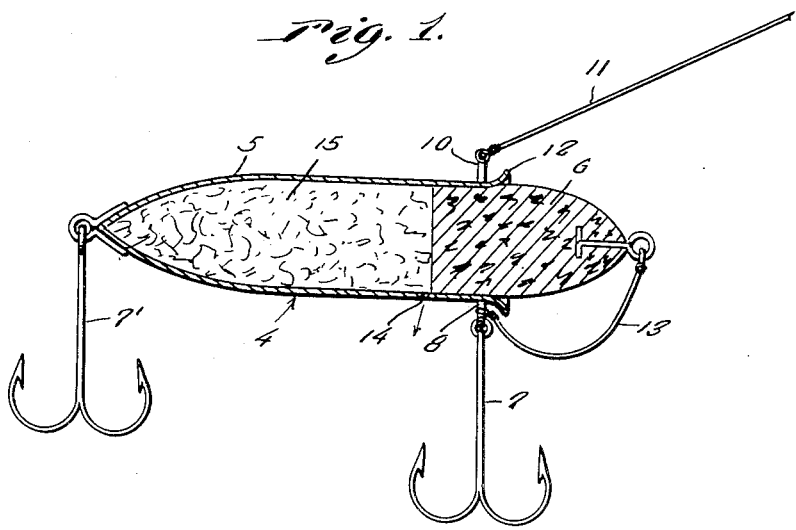
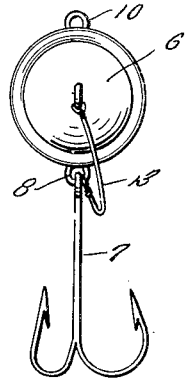
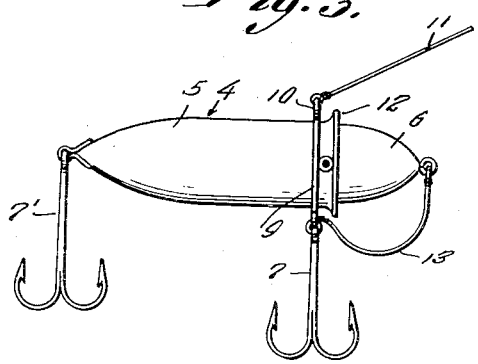
Inventor
A. S. Haislip
By Clarence A. O'Brien
Attorney Patented Sept. 29, 1936

2,055,841

UNITED STATES PATENT OFFICE 2,055,841

ARTIFICIAL BAIT

Albert Sidney Haislip, Fredericksburg, Va.

Application September 10, 1935, Serial No. 39,973

6 Claims. (Cl. 43—46)

This invention relates to a novel and improved artificial bait of the character frequently referred to in the prior art and the trade as a fishing lure and, as the name implies, it is expressly designed to embody unique ways and means of alluring fish to appreciably increase the success of the user.

I am conversant with many different types and varieties of fishing lures and cognizant of the fact that it is the general idea to incorporate in the structure some ingenious adaptation calculated to deceptively attract the victim, this being done by spinners, glistening reflectors and similar contrivances fashioned to attract the attention of the prey.

In most of these prior art devices with which I am now familiar the fundamental idea invoked by the originator tends to accomplish the desired result by giving the artificial creature or bait a realistic and life-like action. This activated performance, feeble or otherwise, allures the fish and is reasonably successful according to a concensus of opinion.

In reducing to practice the invention herein involved I contemplate the provision of an artificial bait or lure which is designed to give premium performance to anglers in that while its action is life-like, it resembles, when in the water, a more or less victimized floundering creature helplessly sinking in the water, this being accomplished by the issuance from the body of the bait of an incessant flow of bubbles, these bubbles possessing the requisite power to attract.

Or stated otherwise my chief aim is to provide an appropriately designed artificial bait characterized by suitable extraneous accessories and shape designed to attract the attention of the fish but structurally distinct in that it is charged with "dry ice" (carbon dioxide) which compound continuously generates a gas, the gas being allowed to escape through a port in the shell or body in order to provide the requisite stream of alluring bubbles.

A further object and purpose is to provide a hollow cup-like shell or container having a removable buoyant plug at one end permitting the parts to assemble in forming a float, the shell being provided with a restricted discharge orifice for gas and being charged with a self-generating product such as dry ice whose continuous evaporation causes a more or less continuous flow of gas to stream out through the orifice while prohibiting the entry of water, whereby to develop the desired attraction bubbles and produce a slight quiver or motion for power of attraction.

By way of introduction to the succeeding description of the figures, detailed description of the invention, and concluding claims I would say that the fundamental idea has to do with the provision of any suitable type of an artificial bait equipped with hooks for regular baiting and attachable to the fishing line, the bait being in the form of a hollow buoyant container for the gaseous charge or filler utilized to generate the gas for producing the bubble stream.

In the accompanying illustrative drawing:

Figure 1 is a longitudinal sectional view through an artificial bait or fishing lure showing the broad principle of construction and illustrating how the inventive idea is carried into effect in accordance with my preferred conception.

Figure 2 is an end view of Figure 1, that is a view observing it from right to left.

Figure 3 is a side elevational view on a slightly reduced scale.

As before indicated any suitable type of a body or artificial bait may be utilized and this is referred to in the drawing by the numerals 4. As shown it comprises a tube like metal or hollow shell 5 open at one end to accommodate an appropriate closure 6. The shell is depicted in the drawing as representing a fish or other creature. It is provided with suitable depending baiting hooks 7 and 7', the hook 7 being suspended from an eye 8 formed as a part of a band or ring 9 which surrounds the frontal portion of the shell. There is also a ring on top indicated at 10 to accommodate the fishing line 11. At this end the mouth of the shell is flared outwardly as indicated at 12 to facilitate insertion of the closure. The closure which may be constructed otherwise, is here shown in the form of a cork which is simply plugged into the body. The cork is suitably anchored against displacement by way of a cord or the like 13. Inwardly of the plug and adjacent the mouth and preferably on the bottom side is an opening 14 in the hollow body or shell. This constitutes an outlet for the gas flow which is utilized for bubbling the water to attract the attention of the fish. Any suitable charge of gas generating material might well be placed in the container formed by the shell. I have discovered however that this can be satisfactorily accomplished by using so-called "dry ice" 15. It is evident therefore that in practice all that is necessary is to remove the closure or plug 6 and place in the container or body a quantity of "dry ice." This may be done as often as the fisherman desires. As a general proposition the fisherman will carry a limited quantity of dry ice in a preserving bag or similar container. The dry ice, as is well known, is in a compressed pack and it is easy to break off a small piece or chunk and insert it into the cup-like shell 5. Immediately upon inserting the dry ice, it begins to evaporate and forms the gas which escapes through the discharge hole 14. Then when the bait is thrown into the water, the escaping gas stream leaks out through said opening to develop the requisite bubble effect and to simultaneously give the entire unit a slight feeble quiver. As a general rule the hole 14 is at the bottom and it forms a stream of bubbles as the bait is pulled along by way of the line 11 and the bait presents a peculiar yet attractive appearance. The appearance may be said to be life-like and of such reality as to undoubtedly attract the fish. The bubbles pervade the water within the vicinity of the path of travel and have a tendency to cause the bait to wiggle in a feeble way resembling a drowning creature. This idea of utilizing bubbles is calculated to more effectively attract the fish because they will less cautiously lunge at the bait and pounce on it relentlessly. In other words I contemplate injecting into the conception an element of psychology believed to be of cardinal importance to the fishermen due to the ability of the bait to more effectively allure the victim into the "trap."

From an angler's point of view I believe that a fishing lure of the type herein disclosed is not only ingenious but is in a sense an innovation. Not only will the final article marketed be characterized by such additional external accessories as may be needed, but it will be so made as to promote simplicity and economy. The shape of the shell 5 will vary according to different circumstances. There may be one or more hooks. Instead of having the bottom hole 14 alone there may be another one at the top in the event that the body should turn over in the water. Requisite facilities for buoyancy and balance may be incorporated if desired. The part 6 may be in the nature of any suitable type of a closure, that is it need not necessarily be a cork. Or stated otherwise externally and from a point of configuration and appearance the artificial bait will be fortified with suitable deceptive appurtenances. The main idea manifestly is to incorporate in an artificial bait, irrespective of its construction, suitable means for generating a gas which gas in escaping into the water forms bubbles, that is an incessant stream of bubbles sufficient to produce an entirely new effect and to accomplish the desired result in a more reliable and dependable manner.

It is thought that persons skilled in the art to which the invention relates will be able to obtain a clear understanding of the invention after considering the description in connection with the drawing. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

1. A fishing lure of the character described comprising a buoyant body constituting a float and having a gas discharge opening and a gas generating compartment in communication with said opening, and a charge of slow melting and evaporating gas generating material in said compartment, the gas being formed by automatic evaporation and being permitted to escape continuously through the discharge opening, whereby to generate an intermittent stream of bubbles in the manner and for the purposes described.

2. A fishing lure of the type described comprising a buoyant hollow apertured shell, and a charge of self-acting continuous gas generating material in said shell, the stream of gas being discharged into the water through the aperture in said shell.

3. An artificial bait comprising a float provided with a gas discharge opening, and gas generating means in said float continuously ejecting a stream of gas through said discharge opening, whereby to prevent the entrance of surrounding water and to simultaneously produce intermittent bubbles in the surrounding water.

4. In a fish lure of the class described, a hollow shell constituting a cup, a buoyant closure for said cup, said cup being shaped to resemble a predetermined creature, being adapted to contain automatic gas generating means, and having a discharge opening through which an expansive jet of gas is emitted.

5. An artificial bait comprising a fishing lure including a hollow buoyant body open at one end, a buoyant closure for said open end, said body being provided with a gas discharge passage, and a charge of dry ice in said body, said dry ice during the course of evaporation giving off an expansive gas and the gas being emitted through the discharge passage in the manner and for the purposes described.

6. A fishing lure of the class described comprising an artificial bait body having a gas discharge opening and a gas generating compartment in communication with said opening, and a charge of gas generating material in said compartment, the gas being formed by automatic evaporation of said material and being permitted to escape continuously through the discharge opening whether the lure is in the water or out of the water, whereby to form an intermittent stream of bubbles when submerged in the water.

ALBERT SIDNEY HAISLIP.